(No Model.) 2 Sheets—Sheet 1.
O. W. WADE.
DEVICE FOR RELEASING HORSES FROM HARNESS AND VEHICLES.
No. 334,097. Patented Jan. 12, 1886.
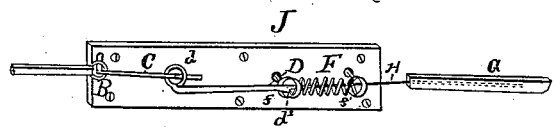
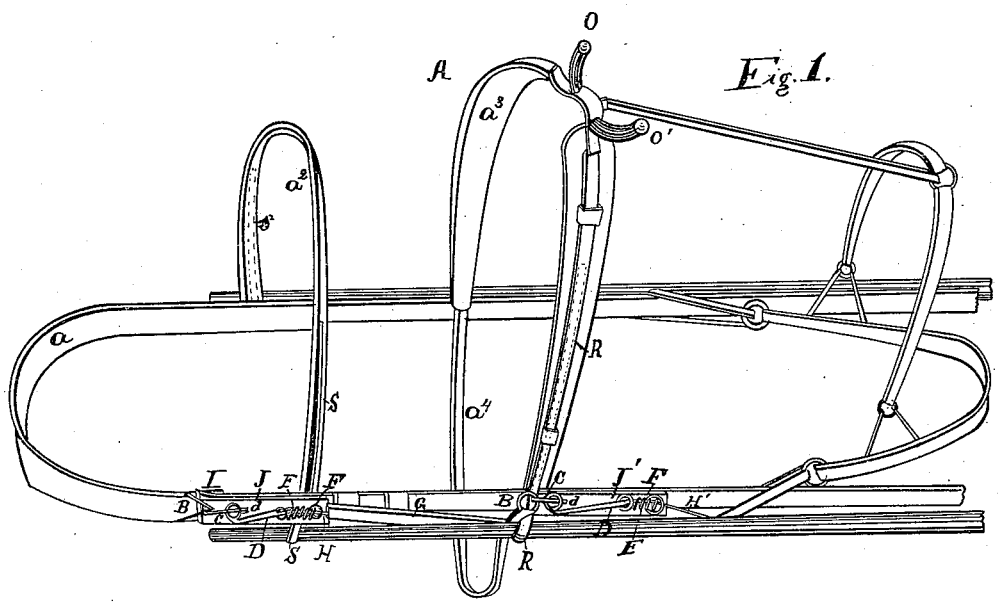

(No Model.) 2 Sheets—Sheet 2.
O. W. WADE.
DEVICE FOR RELEASING HORSES FROM HARNESS AND VEHICLES.
No. 334,097. Patented Jan. 12, 1886.

Witnesses.
N. A. Haseltine.
G. A. Haseltine.

Inventor.
Oron Wesley Wade
By S. A. Haseltine & Bro.
Attorneys.

UNITED STATES PATENT OFFICE.

ORON WESLEY WADE, OF CAVE SPRING, MISSOURI.

DEVICE FOR RELEASING HORSES FROM HARNESS AND VEHICLES.

SPECIFICATION forming part of Letters Patent No. 334,097, dated January 12, 1886.

Application filed August 17, 1885. Serial No. 174,673. (No model.)

*To all whom it may concern:*

Be it known that I, ORON WESLEY WADE, a citizen of the United States, residing at Cave Spring, in the county of Greene and State of Missouri, have invented certain new and useful Improvements in Devices for Releasing Horses from Harness and Vehicles; and I do hereby declare the following to be a full, clear, and exact description of the invention, such as will enable others skilled in the art to which it appertains to make and use the same.

My invention relates to improvements in devices for releasing a horse or team from a vehicle, the object of which is to provide a cheap, simple, convenient, and durable device for quickly unharnessing a horse or team by means of a rod or rods or cords extending through a sheath or protector from the vehicle to the girth and breast-plate or hame or hame-string, so as to unfasten the same; also a device for supporting the tongue or thills of the vehicle. These objects I attain by means of the device illustrated in the accompanying drawings, forming a part of this specification, in which—

Figure 2:
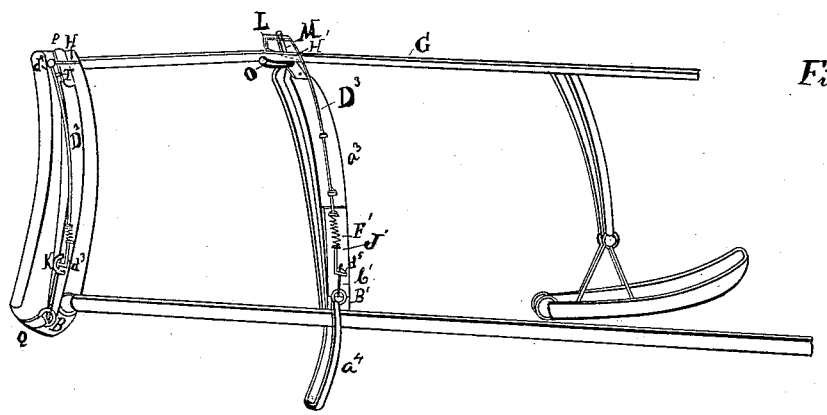
Figure 3:
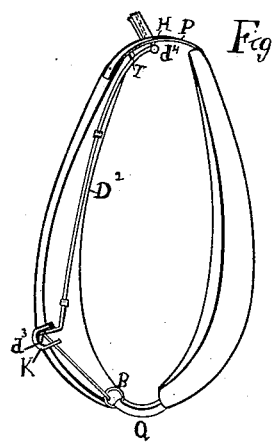

Figure 1 is a view in elevation of an ordinary "breast-plate" harness with the device attached. Fig. 2 is an ordinary "hame" harness, with a modification of the device. Fig. 3 is a modification of the hame attachment or fastening enlarged. Fig. 4 is an enlargement of one of the plates with the catch.

Similar letters of reference indicate corresponding parts in the several figures.

A represents a harness, of any desired shape and material, having a breast-plate, $a$, (shown in Fig. 1,) support $a^2$, back-band $a^3$, girth $a^4$. The crupper-strap is preferably omitted, to prevent the horse when frightened from holding the same beneath its tail. Hames may be used instead of the breast-plate, as shown in Fig. 2. The harness may be single or double, as desired.

J is a plate of any desired size and shape, secured to the harness by rivets or other suitable means. To said plate is hinged a tongue, C, which is bent so as to receive and hold a ring or loop, B. Said tongue forms a lever, the large end of which is secured by a suitable catch, which may be removed to let the tongue fly back and release the ring or loop B. This may be accomplished in different ways, preferably by a spring-catch, D, which has an eye, $d$, and passes through eyelets $f'$ $f$, between which and on the said catch-rod D is a spring, preferably a spiral spring, F, which rests against the eyelet $f'$, and a shoulder, $d^2$, to hold the catch forward, so that the eye $d$ may receive the tongue C and hold it firmly in place.

H is a cord or rod attached to the catch-rod D, and extending back to the vehicle.

G is a shield extending from the plate J or rod D to the desired place in the vehicle, for protecting the wire or cord H from being caught or pulled accidentally, to prevent releasing the horse when not desired.

The breast-plate $a$ is made of two parts, as shown at I, the plate J being secured to the end of one part and the loop B to the other, so that they can be easily coupled or attached firmly in place and quickly released by the string H. The girth $a^4$ and back-band $a^3$ are secured in a similar way, to be released by a cord or rod, H', attached to the cord or rod H, or passing through the same sheath to the vehicle, so as to be drawn at the same time for releasing the girth as or just before the breast-strap or hames are released. For this purpose a spring-catch is secured to the plate J', and is operated as above set forth for the breast-plate.

In using the device for either single or double hame harness the catch is preferably modified, as shown in Figs. 2 and 3. The catch-rod $D^2$ is provided with a hook, $d^3$, and the tongue may be pivoted or hinged to the lower end of the hame, and is made to swing up beneath a loop, K, which is secured to the hame or a plate on the hame, so as to bend up over the tongue when secure, as shown. The rod $D^2$ is provided with the hook $d^3$, to catch the tongue and hold it in place, or to raise up and release it. At the upper end of the hame the said rod $D^2$ has an arm or crank, $d^4$, to which the cord or wire H is attached for raising the hook $d^3$, and also a spring, T, to throw the crank $d^4$ back and hold the catch in place. In this case the girth is provided with a plate, J', as in the first description, above which the rod $D^3$ passes up the back-band, and may be attached to the cord H, but is preferably secured to one end of an elbow-shaped lever, L, which is pivoted to a suitable support or post, M, and to the other end of the said lever the cord or rod D³ is secured, which passes down beside the back-band and is secured to the plate J', and is provided with a spring, F', and a loop, d⁵, to receive the tongue C', by which the girth is secured. The shield G may be placed along the top of the harness to the vehicle. The shield, by its attachment to the vehicle and the harness, protects the cords or rods H H' from all strain or jerks.

O O' are projections or horns to receive the lines, which are not placed through rings in the harness for fear of catching. These horns or projections extend upward, outward, and forward, to permit the lines to be easily thrown off, when desired, without catching. The lines rest between these projections to hold them in place, and said lines may be made long, so that after the horse is freed from the harness it may be held by the lines. Thus I have a harness that may be quickly and easily removed from the horse or team in case of danger, as in case of runaway, &c. By drawing on the cords or rods H H' the breast-plate or hame-string and girth are loosened and the horse can walk out.

To insure a speedy release of the harness, the hames are provided with a suitable spring, preferably a spring-bow, P, secured to the top of each hame, so as to throw them apart when the hame-string is loosened.

If desired, the collar may be divided at the bottom, so as to take it off with the hames. In this case the collar is made so that one part may enter the other to make the same firm when in place, yet free to slip out when the hame-string Z is loosened.

The thills or tongue are supported by a suitable spring attached to the vehicle, so as to relieve the pressure or weight from the team and to support the harness from the ground when the horse or horses are unharnessed. Said vehicle is also preferably provided with a suitable brake to stop the same in case of runaway, &c.

R is a support secured to the thills or shafts to hold the harness up for convenience in harnessing, &c. It may be in the shape of a bow above the harness, but is preferably formed in the shape of an iron band in the back-band, secured to the thills or shafts on each side. The hames may also be secured to the thills to support them when desired by means of supports or rods S S, and the vehicle may be provided with a suitable device to catch and hold the tongue or thills up in any desired position.

Having thus described my invention, what I claim as new, and desire to secure by Letters Patent, is—

1. In a harness, a plate, J, having a tongue, C, catch D, spring F, and string or rod H, substantially as shown and described.

2. A catch having a loop, d, a shoulder, d², and eyelets f' f, combined with a spring, F, cord or rod H, and tongue C, in combination with a harness, substantially as shown and described.

3. The combination of a harness and cords or rods H H' with a sheath, G, and the detaching devices, substantially as and for the purpose specified.

4. The combination, in a harness, of a hame-string secured by a catch, and a girth secured in the same way, with a sheath, G, and cords or rods H H', all arranged substantially as and for the purpose specified.

In testimony whereof I affix my signature in presence of two witnesses.

ORON WESLEY WADE.

Witnesses:
S. C. HASELTINE,
S. H. HASELTINE.